United States Patent
Zimmanck

(10) Patent No.: US 12,261,441 B2
(45) Date of Patent: Mar. 25, 2025

(54) METHODS AND APPARATUS FOR DISCHARGE PROTECTION IN A STORAGE SYSTEM

(71) Applicant: Enphase Energy, Inc., Petaluma, CA (US)

(72) Inventor: Donald Richard Zimmanck, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 83 days.

(21) Appl. No.: 18/376,272

(22) Filed: Oct. 3, 2023

(65) Prior Publication Data

US 2024/0128756 A1    Apr. 18, 2024

Related U.S. Application Data

(60) Provisional application No. 63/415,479, filed on Oct. 12, 2022.

(51) Int. Cl.
*H02J 3/32*    (2006.01)
*H02J 3/00*    (2006.01)
(Continued)

(52) U.S. Cl.
CPC ............. *H02J 3/32* (2013.01); *H02J 3/0073* (2020.01); *H02J 3/38* (2013.01); *H02J 7/0029* (2013.01);
(Continued)

(58) Field of Classification Search
CPC .... H02J 3/32; H02J 7/0048; H02J 3/38; H02J 2207/20; H02J 2300/24
See application file for complete search history.

(56) References Cited

U.S. PATENT DOCUMENTS 9,966,761 B1 *   5/2018   Kim ......................... H02J 4/00
10,084,334 B1 *  9/2018   Dao ....................... H02J 7/0031
(Continued)

FOREIGN PATENT DOCUMENTS

CN        112271772 A      1/2021
KR    10-2017-0121524 A    11/2017
(Continued)

OTHER PUBLICATIONS

PCT International Search Report and Written Opinion for application No. PCT/US2023/034502 dated Feb. 2, 2024, 8 pgs.

*Primary Examiner* — Jared Fureman
*Assistant Examiner* — Duc M Pham
(74) *Attorney, Agent, or Firm* — Moser Taboada

(57) ABSTRACT

Methods and systems for discharge protection in a storage system are provided herein. For example, a grid detection circuit configured for discharge protection in an AC battery system includes an input side that is configured to connect between a DC power source and a battery management unit (BMU) of the AC battery system and an output side that is configured to connect between an output side of an inverter and an AC power source, wherein when the AC power source is detected by the grid detection circuit, the grid detection system allows the inverter to maintain a charge at the DC power source and the battery management unit (BMU) to operate within an under-voltage-lockout (UVLO) at or above a first charge threshold, and wherein when the AC power source is not detected by the grid detection circuit, the grid detection system allows the inverter to maintain a charge at the DC power source and the battery management unit (BMU) to operate within an under-voltage-lockout (UVLO) at or above a second charge threshold, and when the AC power source is not detected by the grid detection circuit and a charge of the DC power source falls below the second charge threshold that is different from the (Continued)

first charge threshold, the grid detection system allows the battery management unit (BMU) to enter a sleep mode.

14 Claims, 4 Drawing Sheets

(51) Int. Cl.
*H02J 3/38* (2006.01)
*H02J 7/00* (2006.01)

(52) U.S. Cl.
CPC ......... *H02J 7/0048* (2020.01); *H02J 2207/20* (2020.01); *H02J 2300/24* (2020.01)

(56) References Cited

U.S. PATENT DOCUMENTS

2022/0140623 A1* 5/2022 Fornage .............. H02J 7/00032
   320/118
2022/0140641 A1* 5/2022 Fornage .................. H02J 7/02
   307/115

FOREIGN PATENT DOCUMENTS

KR    10-2018-0007673 A    1/2018
KR    10-2018-0090673 A    8/2018

* cited by examiner

METHODS AND APPARATUS FOR DISCHARGE PROTECTION IN A STORAGE SYSTEM

CROSS-REFERENCE TO RELATED APPLICATIONS

The present application claims the benefit of and priority to U.S. Provisional Application Ser. No. 63/415,479, filed on Oct. 12, 2022, the entire contents of which is incorporated herein by reference.

BACKGROUND

Field

Embodiments of the present disclosure generally relate to distributed energy generation systems and, for example, to methods and apparatus used for discharge protection in a storage system.

Description of the Related Art

An energy management system provides an innovative solution to a main panel upgrade (MPU) by connecting additional photovoltaics (PVs) and storage system(s) to a smart switch (microgrid interconnect device (MID)), e.g., as opposed to the main panel, thus avoiding the MPU for whole home and subpanel backup systems.

A common issue with the storage system (e.g., battery system) is trying to ensure that the storage system maintains a healthy state-of-charge (SoC) when disconnected from one or more power sources for extended/long periods of time. The storage systems usually consist of several sub-systems such as a battery-management-unit (BMU), which are responsible for managing the health of one or more batteries in the storage system and protecting the one or more batteries from potentially damaging conditions, e.g., as over current, under/over temperature, and under/over voltage.

Additionally, the sub-systems require power to operate, which is usually pulled from the battery itself, thus allowing the sub-systems to operate temporarily without a power source, as well as ensuring all protections are in place before any power source is allowed to charge or discharge the battery. When the sub-systems are powered from the battery, the sub-systems gradually drain the battery and if left unchecked, the sub-systems will eventually discharge the battery to the point of being damaged. A common approach to address such an issue is to incorporate a "sleep mode" which shuts down the sub-systems when the battery voltage or state-of-charge reaches a sufficiently low value. With the protective sub-systems shut down, the parasitic power draw from the battery is near zero allowing it to survive long durations without power. In order to "wake up" the sub-systems upon availability of power, a small AC-DC charger (a wake-up charger) that can only power off AC is incorporated. When an AC power source is connected to the sub-system while in "sleep mode", the wake-up charger can charge the battery until the voltage rises above an under voltage lock out (UVLO), at which point the remaining sub-systems can re-engage and manage the battery. Such an approach, however, are relatively large, complex and costly to operate, and not very efficient.

Therefore, the inventors have provided improved methods and apparatus for discharge protection in a storage system.

SUMMARY

Embodiments disclosed herein provide methods and apparatus for discharge protection in a storage system. For example, a grid detection circuit configured for use with an AC battery system comprises an input side that is configured to connect between a DC power source and a battery management unit (BMU) of the AC battery system and an output side that is configured to connect between an output side of an inverter and an AC power source. When the AC power source is detected by the grid detection circuit, the grid detection circuit allows the inverter to maintain a charge at the DC power source and the battery management unit (BMU) to operate within an under-voltage-lockout (UVLO) at or above a first charge threshold. When the AC power source is not detected by the grid detection circuit, the grid detection circuit allows the inverter to maintain the charge at the DC power source and the battery management unit (BMU) to operate within an under-voltage-lockout (UVLO) at or above a second charge threshold that is different from the first charge threshold. When the AC power source is not detected by the grid detection circuit and a charge of the DC power source falls below the second charge threshold, the grid detection circuit allows the battery management unit (BMU) to enter a sleep mode.

In accordance with at least some embodiments, a method for discharge protection in an AC battery system comprises determining if AC power source is detected by a grid detection circuit; when the AC power source is detected by the grid detection circuit, allowing an inverter to maintain a charge at a DC power source and a battery management unit (BMU) to operate within an under-voltage-lockout (UVLO) at or above a first charge threshold; when the AC power source is not detected by the grid detection circuit, allowing the inverter to maintain a charge at the DC power source and the battery management unit (BMU) to operate within an under-voltage-lockout (UVLO) at or above a second charge threshold that is different from the first charge threshold; and when the AC power source is not detected by the grid detection circuit and a charge of the DC power source falls below the second charge threshold, allowing the battery management unit (BMU) to enter a sleep mode.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure comprise methods and apparatus for discharge protection in a storage system.

For example, in at least some embodiments, a conventional wake-up charger can be replaced with a grid detection circuit that reduces the UVLO when an AC power source is present. Unlike the conventional methods and apparatus described above, the methods and apparatus described herein are relatively small, simple and inexpensive to operate, and very efficient.

Figure 1:
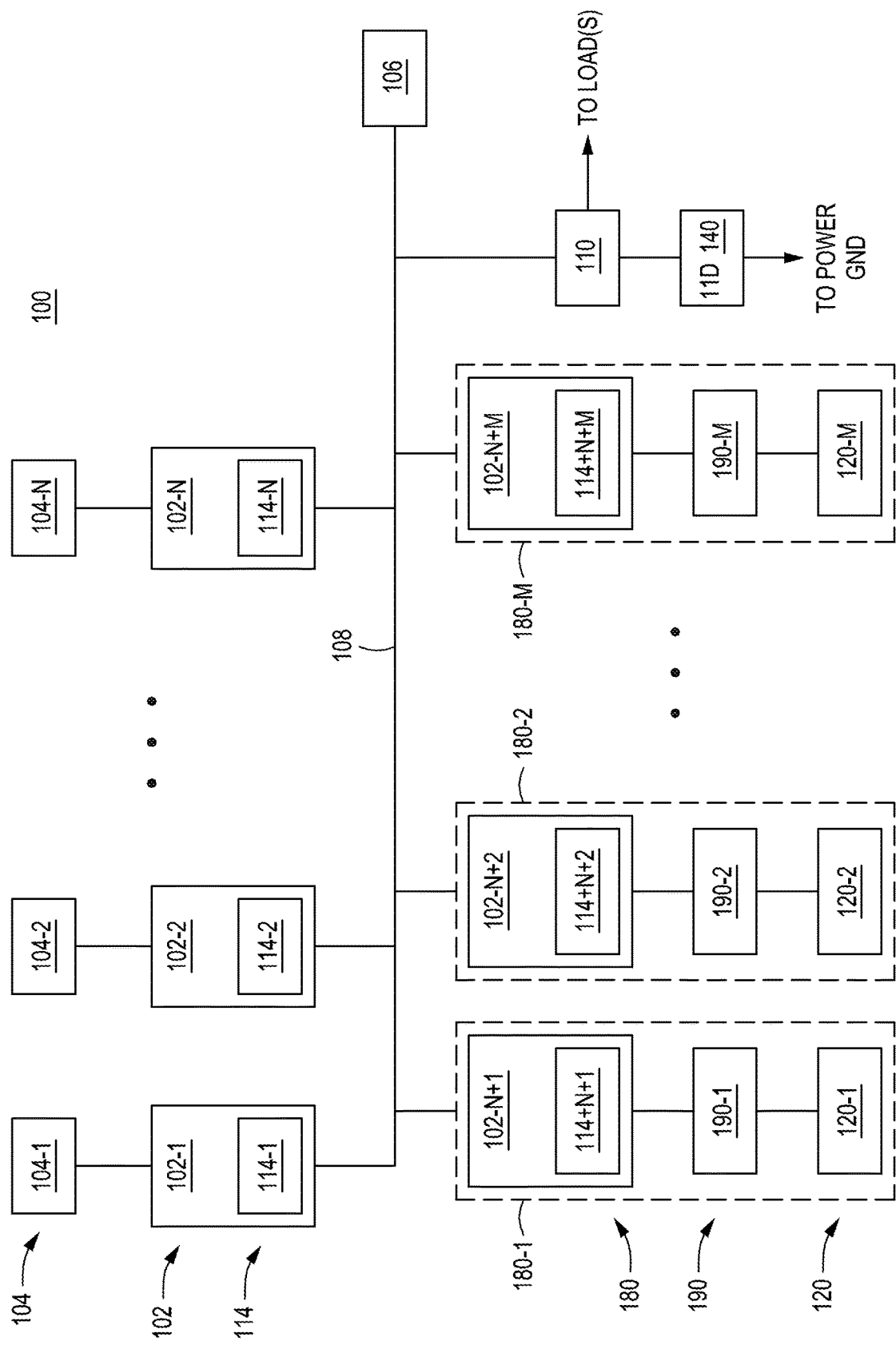
FIG. 1 is a block diagram of a system for power conversion, in accordance with at least one embodiment of the present disclosure.

FIG. 1 is a block diagram of a system 100 for power conversion using one or more embodiments of the present invention. This diagram only portrays one variation of the myriad of possible system configurations and devices that may utilize the present invention.

The system 100 is a microgrid that can operate in both an islanded state and in a grid-connected state (i.e., when connected to another power grid (such as one or more other microgrids and/or a commercial power grid). The system 100 comprises a plurality of power converters 102-1, 102-2, . . . 102-N, 102-N+1, and 102-N+M collectively referred to as power converters 102 (which also may be called power conditioners); a plurality of DC power sources 104-1, 104-2, . . . 104-N, collectively referred to as power sources 104; a plurality of energy storage devices/delivery devices 120-1, 120-2, . . . 120-M collectively referred to as energy storage/delivery devices 120; a system controller 106; a plurality of BMUs 190-1, 190-2, . . . 190-M collectively referred to as BMUs 190 (battery management units); a system controller 106; a bus 108; a load center 110; and an IID 140 (island interconnect device) (which may also be referred to as a microgrid interconnect device (MID)). In some embodiments, such as the embodiments described herein, the energy storage/delivery devices are rechargeable batteries which may be referred to as batteries 120, although in other embodiments the energy storage/delivery devices may be any other suitable device for storing energy and providing the stored energy. Generally, each of the batteries 120 comprises a plurality cells that are coupled in series, e.g., eight cells coupled in series to form a battery 120.

Each power converter 102-1, 102-2 . . . 102-N is coupled to a DC power source 104-1, 104-2 . . . 104-N, respectively, in a one-to-one correspondence, although in some other embodiments multiple DC power sources may be coupled to one or more of the power converters 102. The power converters 102-N+1, 102-N+2 . . . 102-N+M are respectively coupled to plurality of energy storage devices/delivery devices 120-1, 120-2 . . . 120-M via BMUs 190-1, 190-2 . . . 190-M to form AC batteries 180-1, 180-2 . . . 180-M, respectively. Each of the power converters 102-1, 102-2 . . . 102-N+M comprises a corresponding controller 114-1, 114-2 . . . 114-N+M (collectively referred to as the inverter controllers 114) for controlling operation of the power converters 102-1, 102-2 . . . 102-N+M.

In some embodiments, such as the embodiment described below, the DC power sources 104 are DC power sources and the power converters 102 are bidirectional inverters such that the power converters 102-1 . . . 102-N convert DC power from the DC power sources 104 to grid-compliant AC power that is coupled to the bus 108, and the power converters 102-N+1 . . . 102-N+M convert (during energy storage device discharge) DC power from the batteries 120 to grid-compliant AC power that is coupled to the bus 108 and also convert (during energy storage device charging) AC power from the bus 108 to DC output that is stored in the batteries 120 for subsequent use. The DC power sources 104 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power. In other embodiments the power converters 102 may be other types of converters (such as DC-DC converters), and the bus 108 is a DC power bus.

The power converters 102 are coupled to the system controller 106 via the bus 108 (which also may be referred to as an AC line or a grid). The system controller 106 generally comprises a CPU coupled to each of support circuits and a memory that comprises a system control module for controlling some operational aspects of the system 100 and/or monitoring the system 100 (e.g., issuing certain command and control instructions to one or more of the power converters 102, collecting data related to the performance of the power converters 102, and the like). The system controller 106 is capable of communicating with the power converters 102 by wireless and/or wired communication (e.g., power line communication) for providing certain operative control and/or monitoring of the power converters 102.

In some embodiments, the system controller 106 may be a gateway that receives data (e.g., performance data) from the power converters 102 and communicates (e.g., via the Internet) the data and/or other information to a remote device or system, such as a master controller (not shown). Additionally or alternatively, the gateway may receive information from a remote device or system (not shown) and may communicate the information to the power converters 102 and/or use the information to generate control commands that are issued to the power converters 102.

The power converters 102 are coupled to the load center 110 via the bus 108, and the load center 110 is coupled to the power grid via the IID 140. When coupled to the power grid (e.g., a commercial grid or a larger microgrid) via the IID 140, the system 100 may be referred to as grid-connected; when disconnected from the power grid via the IID 140, the system 100 may be referred to as islanded. The IID 140 determines when to disconnect from/connect to the power grid (e.g., the IID 140 may detect a grid fluctuation, disturbance, outage or the like) and performs the disconnection/connection. Once disconnected from the power grid, the system 100 can continue to generate power as an intentional island, without imposing safety risks on any line workers that may be working on the grid, using the droop control techniques described herein. The IID 140 comprises a disconnect component (e.g., a disconnect relay) for physically disconnecting/connecting the system 100 from/to the power grid. In some embodiments, the IID 140 may additionally comprise an autoformer for coupling the system 100 to a split-phase load that may have a misbalance in it with some neutral current. In certain embodiments, the system controller 106 comprises the IID 140 or a portion of the IID 140.

The power converters 102 convert the DC power from the DC power sources 104 and discharging batteries 120 to grid-compliant AC power and couple the generated output power to the load center 110 via the bus 108. The power is then distributed to one or more loads (for example to one or more appliances) and/or to the power grid (when connected to the power grid). Additionally or alternatively, the generated energy may be stored for later use, for example using batteries, heated water, hydro pumping, $H_2O$-to-hydrogen conversion, or the like. Generally, the system 100 is coupled to the commercial power grid, although in some embodiments the system 100 is completely separate from the commercial grid and operates as an independent microgrid.

In some embodiments, the AC power generated by the power converters 102 is single-phase AC power. In other embodiments, the power converters 102 generate three-phase AC power.

Figure 2:
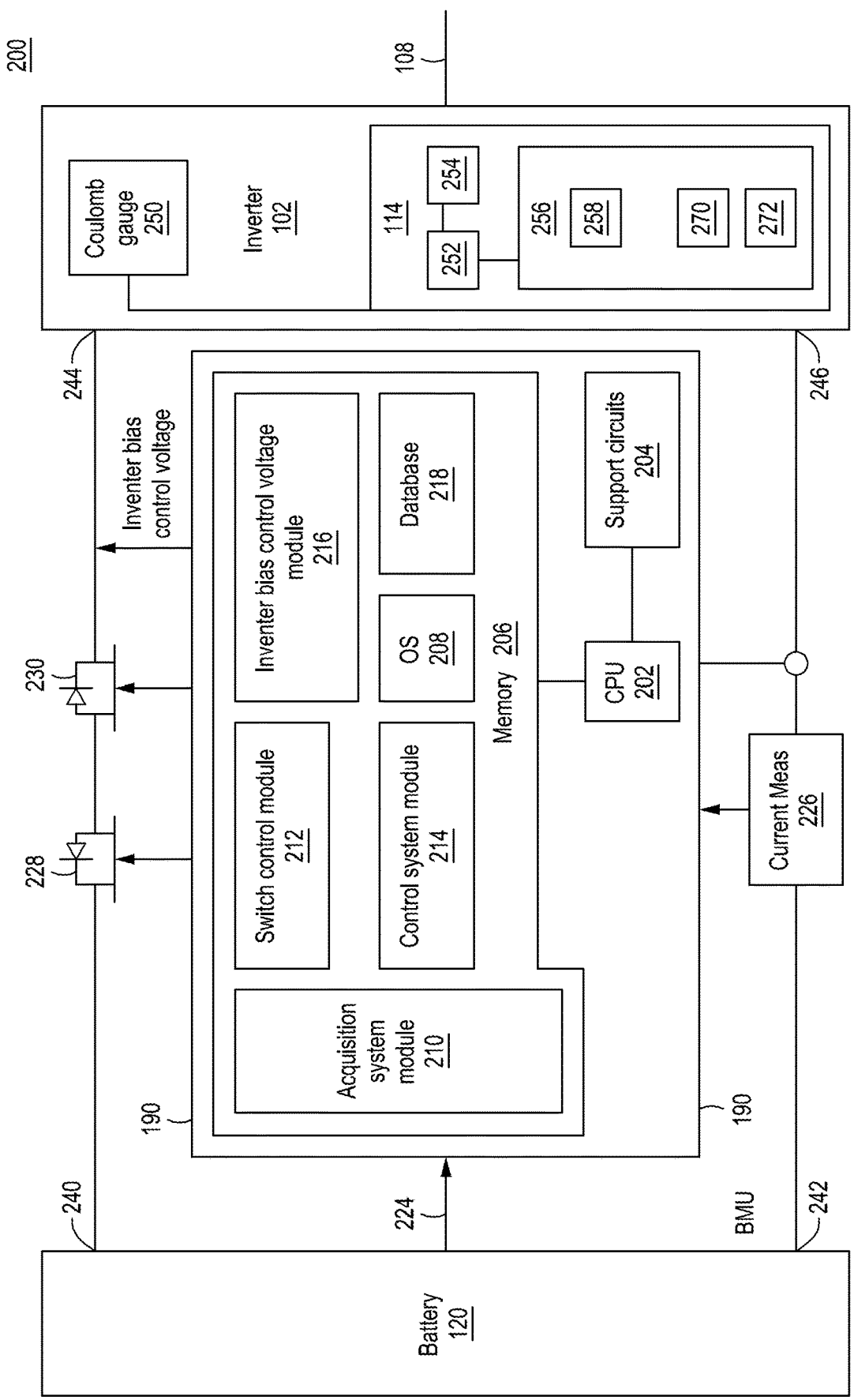
FIG. 2 is a block diagram of an AC battery system, in accordance with at least one embodiment of the present disclosure.

FIG. 2 is a block diagram of an AC battery system 200 (e.g., a storage system) in accordance with one or more embodiments of the present invention. The AC battery system 200 comprises a BMU 190 coupled to a battery 120 and an inverter. A pair of metal-oxide-semiconductor field-effect transistors (MOSFETs) switches—switches 228 and 230—are coupled in series between a first terminal 240 of the battery 120 and a first terminal of the inverter 144 such the body diode cathode terminal of the switch 228 is coupled to the first terminal 240 of the battery 120 and the body diode cathode terminal of the switch 230 is coupled to the first terminal 244 of the power converters 102. The gate terminals of the switches 228 and 230 are coupled to the BMU 190.

A second terminal 242 of the battery 120 is coupled to a second terminal 246 of the power converters 102 via a current measurement module 226 which measures the current flowing between the battery 120 and the power converters 102.

The BMU 190 is coupled to the current measurement module 226 for receiving information on the measured current, and also receives an input 224 from the battery 120 indicating the battery cell voltage and temperature. The BMU 190 is coupled to the gate terminals of each of the switches 228 and 230 for driving the switch 228 to control battery discharge and driving the switch 230 to control battery charge as described herein. The BMU 190 is also coupled across the first terminal 244 and the second terminal 246 for providing an inverter bias control voltage (which may also be referred to as a bias control voltage) to the inverter 102 as described further below.

The configuration of the body diodes of the switches 228 and 230 allows current to be blocked in one direction but not the other depending on state of each of the switches 228 and 230. When the switch 228 is active (i.e., on) while the switch 230 is inactive (i.e., off), battery discharge is enabled to allow current to flow from the battery 120 to the power converters 102 through the body diode of the switch 230. When the switch 228 is inactive while the switch 230 is active, battery charge is enabled to allow current flow from the power converters 102 to the battery 120 through the body diode of the switch 228. When both switches 228 and 230 are active, the system is in a normal mode where the battery 120 can be charged or discharged.

The BMU 190 comprises support circuits 204 and a memory 206 (e.g., non-transitory computer readable storage medium), each coupled to a CPU 202 (central processing unit). The CPU 202 may comprise one or more processors, microprocessors, microcontrollers and combinations thereof configured to execute non-transient software instructions to perform various tasks in accordance with embodiments of the present invention. The CPU 202 may additionally or alternatively include one or more application specific integrated circuits (ASICs). In some embodiments, the CPU 202 may be a microcontroller comprising internal memory for storing controller firmware that, when executed, provides the controller functionality described herein. The BMU 190 may be implemented using a general purpose computer that, when executing particular software, becomes a specific purpose computer for performing various embodiments of the present invention.

The support circuits 204 are well known circuits used to promote functionality of the CPU 202. Such circuits include, but are not limited to, a cache, power supplies, clock circuits, buses, input/output (I/O) circuits, and the like. The BMU 190 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the OS 208 (operating system), if necessary, of the inverter controller 114 that can be supported by the CPU capabilities. In some embodiments, the OS 208 may be one of a number of commercially available operating systems such as, but not limited to, LINUX, Real-Time Operating System (RTOS), and the like.

The memory 206 stores non-transient processor-executable instructions and/or data that may be executed by and/or used by the CPU 202 to perform, for example, one or more methods for discharge protection, as described in greater detail below. These processor-executable instructions may comprise firmware, software, and the like, or some combination thereof. The memory 206 stores various forms of application software, such as an acquisition system module 210, a switch control module 212, a control system module 214, and an inverter bias control module 216. The memory 206 additionally stores a database 218 for storing data related to the operation of the BMU 190 and/or the present invention, such as one or more thresholds, equations, formulas, curves, and/or algorithms for the control techniques described herein. In various embodiments, one or more of the acquisition system module 210, the switch control module 212, the control system module 214, the inverter bias control module 216, and the database 218, or portions thereof, are implemented in software, firmware, hardware, or a combination thereof.

The acquisition system module 210 obtains the cell voltage and temperature information from the battery 120 via the input 224, obtains the current measurements provided by the current measurement module 226, and provides the cell voltage, cell temperature, and measured current information to the control system module 214 for use as described herein.

The switch control module 212 drives the switches 228 and 230 as determined by the control system module 214.

The control system module 214 provides various battery management functions, including protection functions (e.g., overcurrent (OC) protection, overtemperature (OT) protection, and hardware fault protection), metrology functions (e.g., averaging measured battery cell voltage and battery current over, for example, 100 ms to reject 50 and 60 Hz ripple), state of charge (SOC) analysis (e.g., coulomb gauge 250 for determining current flow and utilizing the current flow in estimating the battery SOC; synchronizing estimated SOC values to battery voltages (such as setting SOC to an upper bound, such as 100%, at maximum battery voltage; setting SOC to a lower bound, such as 0%, at a minimum battery voltage); turning off SOC if the power converters 102 never drives the battery 120 to these limits; and the like), balancing (e.g., autonomously balancing the charge across all cells of a battery to be equal, which may be done at the end of charge, at the end of discharge, or in some embodiments both at the end of charge and the end of discharge).

By establishing upper and lower estimated SOC bounds based on battery end of charge and end of discharge, respectively, and tracking the current flow and cell voltage (i.e., battery voltage) between these events, the BMU 190 determines the estimated SOC.

The inverter controller 114 comprises support circuits 254 and a memory 256, each coupled to a CPU 252 (central processing unit). The CPU 252 may comprise one or more processors, microprocessors, microcontrollers and combinations thereof configured to execute non-transient software instructions to perform various tasks in accordance with embodiments of the present invention. The CPU 252 may additionally or alternatively include one or more application specific integrated circuits (ASICs). In some embodiments, the CPU 252 may be a microcontroller comprising internal memory for storing controller firmware that, when executed, provides the controller functionality herein. The inverter controller 114 may be implemented using a general purpose computer that, when executing particular software, becomes a specific purpose computer for performing various embodiments of the present invention.

The support circuits 254 are well known circuits used to promote functionality of the CPU 252. Such circuits include, but are not limited to, a cache, power supplies, clock circuits, buses, input/output (I/O) circuits, and the like. The inverter controller 114 may be implemented using a general purpose computer that, when executing particular software, becomes a specific purpose computer for performing various embodiments of the present invention. In one or more embodiments, the CPU 252 may be a microcontroller comprising internal memory for storing controller firmware that, when executed, provides the controller functionality described herein.

The memory 256 may comprise random access memory, read only memory, removable disk memory, flash memory, and various combinations of these types of memory. The memory 256 is sometimes referred to as main memory and may, in part, be used as cache memory or buffer memory. The memory 256 generally stores the OS 258 (operating system), if necessary, of the inverter controller 114 that can be supported by the CPU capabilities. In some embodiments, the OS 258 may be one of a number of commercially available operating systems such as, but not limited to, LINUX, Real-Time Operating System (RTOS), and the like.

The memory 256 stores non-transient processor-executable instructions and/or data that may be executed by and/or used by the CPU 252. These processor-executable instructions may comprise firmware, software, and the like, or some combination thereof. The memory 256 stores various forms of application software, such as a power conversion control module 270 for controlling the bidirectional power conversion, and a battery management control module 272.

In at least some embodiments, the BMU 190 software is integrated directly into the power converters 102 CPU, thus, unlike conventional BMUs, there is no need for communication between the BMU 190 and the power converters 102, which eliminates the need for complex coordination in power.

Figure 3:
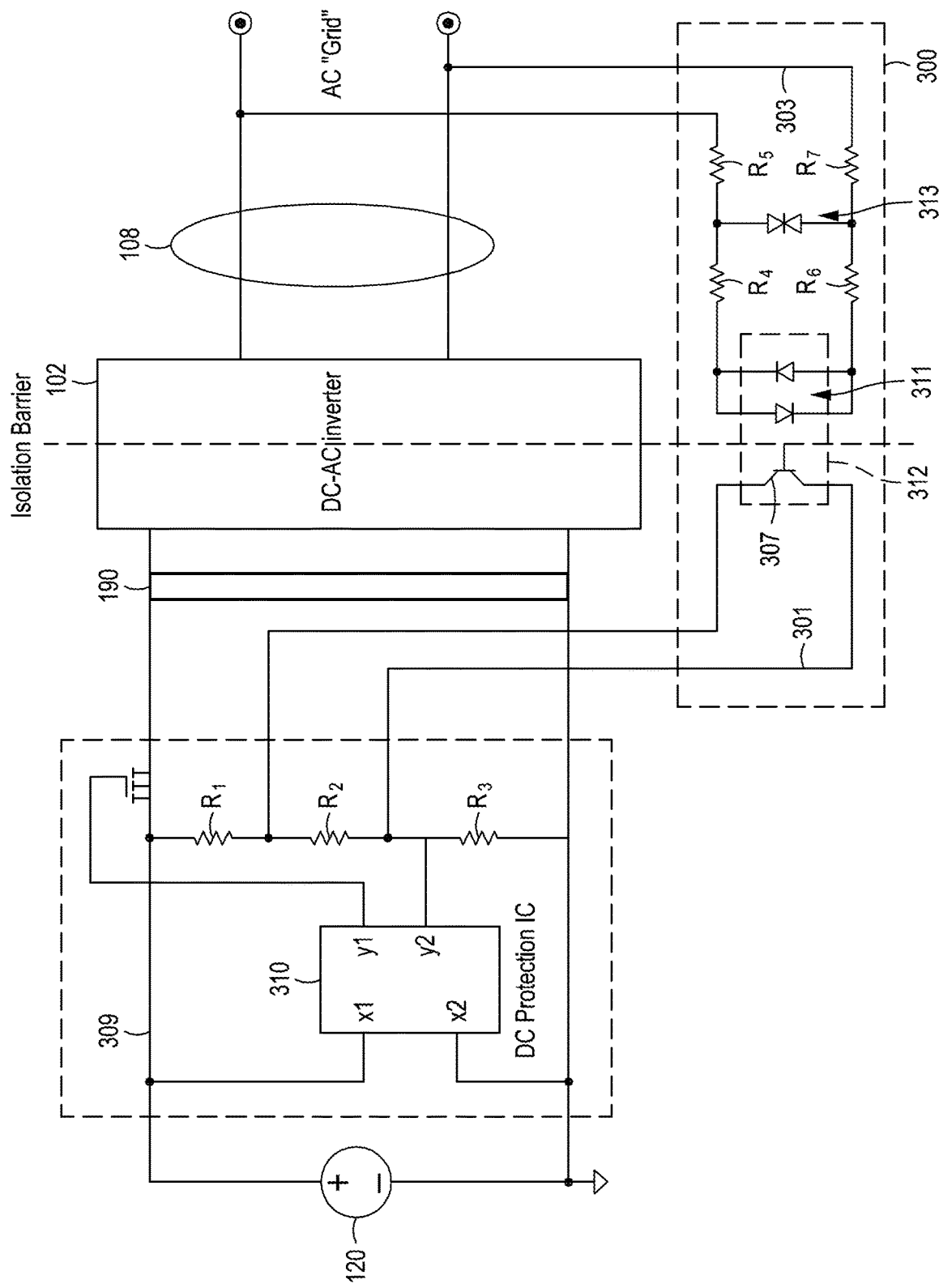
FIG. 3 is a schematic of grid detection circuit configured for use with the AC battery system of FIG. 2, in accordance with at least one embodiment of the present disclosure.

FIG. 3 is a schematic of grid detection circuit 300 configured for use with the AC battery system 200 of FIG. 2, in accordance with at least one embodiment of the present disclosure.

The grid detection circuit 300 comprises an input side 301 that is configured to connect between a DC power source (e.g., the battery 120) and a battery management unit (BMU), e.g., the BMU 190, of the AC battery system 200. The grid detection circuit 300 also comprises an output side 303 that is configured to connect between an output side of an inverter (e.g., the power converters 102) and an AC power source (e.g., the bus 108 that can connect to one of a grid or a photovoltaic, etc.). In at least some embodiments, the inverter can be a DC-AC inverter or other type of inverter capable of performing operations described herein.

The input side 301 comprises a transistor 307 that connects to a voltage divider network of a DC protection circuit 309 connected to the DC power source. The DC protection circuit 309 comprises an IC 310 having an $X_1$ pin and an $X_2$ pin that are connected across the DC power source. The IC 310 also comprises a $Y_1$ pin (e.g., ground) and an $Y_2$ pin that are respectively connected to one or more MOSFETS (n-type or p-type), which connects to the BMU 190, and the voltage divider network, which can include three resistors $R_1$ to $R_3$ connected in series with each other. In at least some embodiments, the output-collector of the transistor 307 connects between the resistors $R_1$ and $R_2$ and the output-emitter of the transistor 307 connects between resistors the $R_2$ and $R_3$.

Continuing with reference to FIG. 3, the output side 303 of the grid detection circuit 300 comprises at least one photo diode, at least one Zennor diode, and a plurality of resistors connected in parallel to each other and the at least one photo diode and the at least one Zennor diode. In at least some embodiments, two photodiodes 311 are connected parallel to each other and opposite the base of the transistor 307. Additionally, a pair of Zennor diodes 313 are connected in series with each other and parallel to each of the photodiodes 311, and the resistors $R_4$ to $R_7$ connected parallel to each other and the two photodiodes 311 and the pair of Zennor diodes 313, with the resistors $R_4$ and $R_7$ connected to the bus 108.

The two photodiodes 311 on the output side of the grid detection circuit 300 and the transistor 307 on the input side of the grid detection circuit 300 form an optocoupler 312. In use, the grid detection circuit 300 develops a rectified dc voltage from the ac line voltage. The magnitude of the dc voltage is sensed by a downstream trigger circuitry (e.g., DC protection circuit 309) to determine when to bias the two photodiodes 311. Due to the rectification stage upstream of the optocoupler 312, the two photodiodes 311 are biased with a dc current.

In accordance with the present disclosure, the grid detection circuit 300 is connected to the DC protection circuit for determining when the battery management unit (BMU) operates within the under-voltage-lockout (UVLO) at or above the first charge threshold and when the battery management unit (BMU) operates within the under-voltage-lockout (UVLO) at or above the second charge threshold.

In at least some embodiments, the BMU 190 can function as a cell level monitor and software running in the power converters 102 CPU, both of which can be powered off the power converters 102 housekeeping power supply, which can be powered downstream of the transistor coupled to pin $Y_1$ of 310. Thus, when the $Y_2$ pin goes below the UVLO threshold of the IC 310, the housekeeping supply is disconnected from the battery 120 completely putting it into "sleep" mode. In the sleep mode, there is no CPU running, e.g., everything is OFF, and the only power draw from the battery 120 is from the IC 310 and the resistor network comprised of the resistors $R_1$, $R_2$, and $R_3$, which is designed to draw just μA of current. Accordingly, the only way to wake up the system is for the voltage on the $Y_2$ pin to rise ABOVE the UVLO threshold of the IC 310, which occurs when the grid detection circuit 300, which is analog, shorts out the resistor $R_2$.

Figure 4:
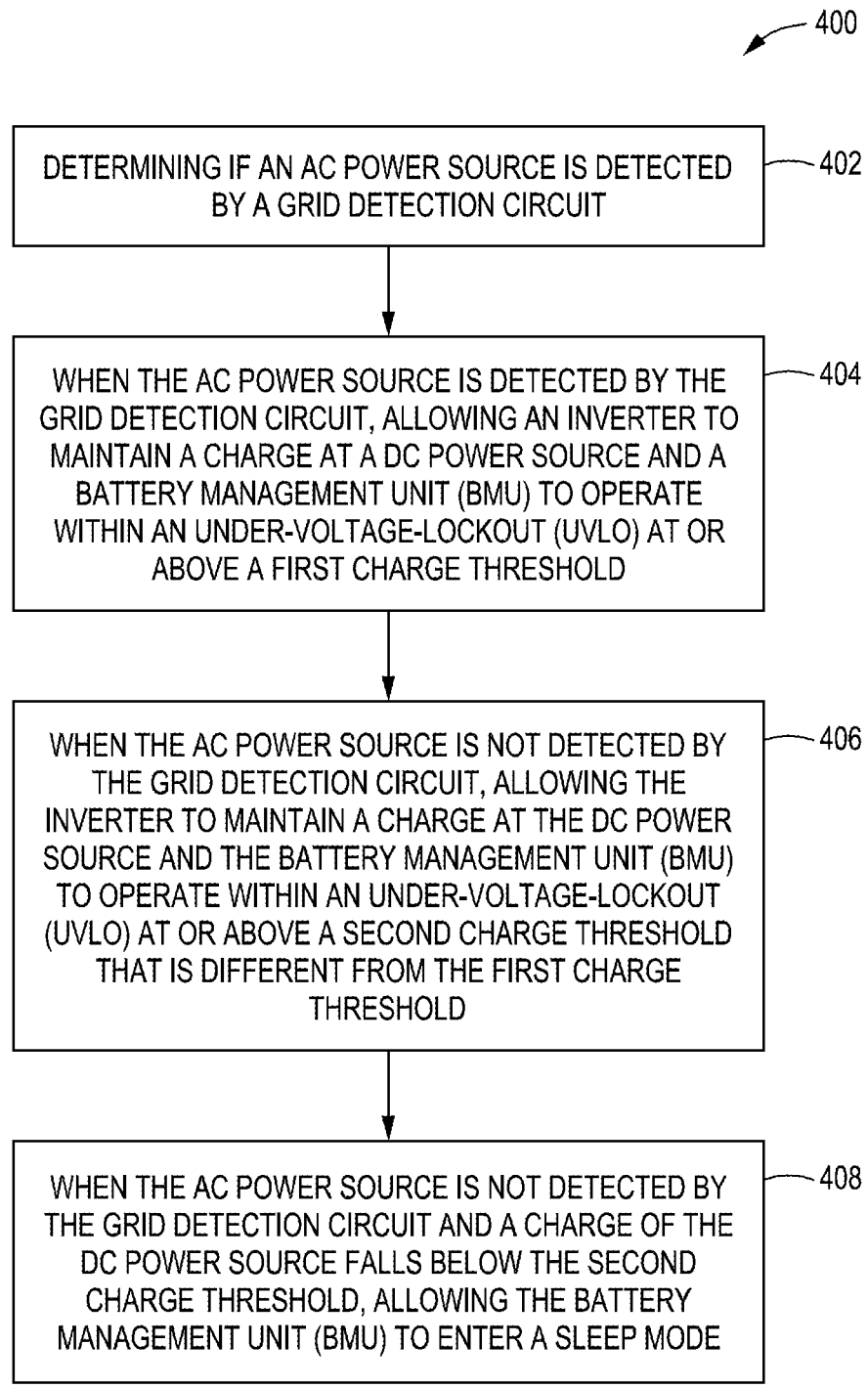
FIG. 4 is a flowchart of a method for discharge protection in AC battery system, in accordance with at least one embodiment of the present disclosure.

For example, FIG. 4 is a flowchart of a method 400 for discharge protection in AC battery system, in accordance with at least one embodiment of the present disclosure. At 402, the method 400 comprises determining if AC power source is detected by a grid detection circuit. For example, in at least some embodiments, the grid detection circuit 300, under the control system module 214, can monitor when the AC power source is connected to the power converters 102 and/or the bus 108.

Next, at 404, the method 400 comprises when AC is detected by the grid detection circuit, allowing an inverter to maintain a charge at a DC power source (the battery 120) and a battery management unit (BMU) to operate within an under-voltage-lockout (UVLO) at or above a first charge threshold (e.g., about 2.5 V/cell). For example, in at least some embodiments, when the grid detection circuit 300 detects that the AC power source (or one or more photovoltaics) is connected to the bus 108, the grid detection circuit 300 controls the battery stack voltage that the system 100 enters sleep mode. For example, as noted above, entering sleep mode is done passively with no software, i.e., via an analog interaction between the UVLO threshold of the IC 310 and the affect the grid detect circuit 100 has on the voltage divider comprised of the resistors $R_1$, $R_2$, and $R_3$. Accordingly, the grid detection circuit 300 allows the power converters 102 to maintain a healthy charge on the DC power source, which will also allow to BMU 190 to operate (e.g., manage the health of a battery of the DC power source and protect the battery from potential damage) using the charge of the DC power source.

Next, at 406, the method 400 comprises when the AC power source is not detected by the grid detection circuit, allowing the inverter to maintain a charge at the DC power source and the battery management unit (BMU) to operate within an under-voltage-lockout (UVLO) at or above a second charge threshold (e.g., about 3.1 V/cell) that is different from the first charge threshold. For example, in at least some embodiments, when the grid detection circuit 300 detects that the AC power source (or one or more photovoltaics) is not connected to the bus 108, the grid detection circuit 300 communicates with the control system module 214 to continues to allow the power converters 102 to maintain a healthy charge on the DC power source, which again will also allow to BMU 190 to operate (e.g., manage the health of a battery of the DC power source and protect the battery from potential damage) using the charge of the DC power source. In at least some embodiments, the grid detection circuit 300 is configured to short out one or more of the resistors $R_1$ to $R_3$ in the voltage divider of the DC protection circuit 309 which is used to measure input voltage, thus effectively reducing the under-voltage-lockout (UVLO) to the second charge threshold.

Next, at 408, the method 400 comprises when the AC power source is not detected by the grid detection circuit and a charge of the DC power source falls below the second charge threshold, allowing the battery management unit (BMU) to enter a sleep mode. For example, in at least some embodiments, when the grid detection circuit 300 detects that the AC power source (or one or more photovoltaics) is not connected to the bus 108 and DC power source 120 falls below the second charge threshold, the grid detection circuit 300 communicates with the control system module 214 to place the BMU 190 in a sleep mode, thus preventing the BMU 190 from draining the battery of the DC power source.

Thereafter, the grid detection circuit 300 continues to monitor whether the AC power source is connected to the bus 108 (e.g., days/weeks/or months later), the grid detection circuit 300 drops the under-voltage-lockout (UVLO), e.g., to the first threshold charge, thus automatically waking the BMU 190 and allowing the power converters 102 to re-charge the battery and the BMU 190 to operate as described above.

While the foregoing is directed to embodiments of the present disclosure, other and further embodiments of the disclosure may be devised without departing from the basic scope thereof.

What is claimed is:

1. A grid detection circuit configured for use with an AC battery system, comprising:
   an input side that is configured to connect between a DC power source and a battery management unit (BMU) of the AC battery system and an output side that is configured to connect between an output side of an inverter and an AC power source,
   wherein when the AC power source is detected by the grid detection circuit, the grid detection circuit allows the inverter to maintain a charge at the DC power source and the battery management unit (BMU) to operate within an under-voltage-lockout (UVLO) at or above a first charge threshold, and
   wherein when the AC power source is not detected by the grid detection circuit, the grid detection circuit allows the inverter to maintain the charge at the DC power source and the battery management unit (BMU) to operate within an under-voltage-lockout (UVLO) at or above a second charge threshold that is different from the first charge threshold, and when the AC power source is not detected by the grid detection circuit and the charge of the DC power source falls below the second charge threshold, the grid detection circuit allows the battery management unit (BMU) to enter a sleep mode.

2. The grid detection circuit of claim 1, wherein the input side of the grid detection circuit comprises a transistor that connects to a voltage divider network of a DC protection circuit connected to the DC power source.

3. The grid detection circuit of claim 2, wherein the grid detection circuit is connected to the DC protection circuit for determining when the battery management unit (BMU) operates within the under-voltage-lockout (UVLO) at or above the first charge threshold and when the battery management unit (BMU) operates within the under-voltage-lockout (UVLO) at or above the second charge threshold.

4. The grid detection circuit of claim 1, wherein the output side of the grid detection circuit comprises at least one photo diode, at least one Zennor diode, and a plurality of resistors connected in parallel to each other and the at least one photo diode and the at least one Zennor diode.

5. The grid detection circuit of claim 1, wherein the inverter is a DC-AC inverter.

6. The grid detection circuit of claim 1, wherein the AC power source is at least one of a grid or a photovoltaic.

7. The grid detection circuit of claim 1, wherein the first charge threshold is about 2.5 V/cell and the second charge threshold is about 3.1 V/cell.

8. A method for discharge protection in an AC battery system, comprising:
   determining if an AC power source is detected by a grid detection circuit;
   when the AC power source is detected by the grid detection circuit, allowing an inverter to maintain a charge at a DC power source and a battery management unit (BMU) to operate within an under-voltage-lockout (UVLO) at or above a first charge threshold;

when the AC power source is not detected by the grid detection circuit, allowing the inverter to maintain the charge at the DC power source and the battery management unit (BMU) to operate within an under-voltage-lockout (UVLO) at or above a second charge threshold that is different from the first charge threshold; and when the AC power source is not detected by the grid detection circuit and the charge of the DC power source falls below the second charge threshold, allowing the battery management unit (BMU) to enter a sleep mode.

9. The method of claim 8, wherein an input side of the grid detection circuit comprises a transistor that connects to a voltage divider network of a DC protection circuit connected to the DC power source.

10. The method of claim 9, wherein the grid detection circuit is connected to the DC protection circuit for determining when the battery management unit (BMU) operates within the under-voltage-lockout (UVLO) at or above the first charge threshold and when the battery management unit (BMU) operates within the under-voltage-lockout (UVLO) at or above the second charge threshold.

11. The method of claim 8, wherein an output side of the grid detection circuit comprises at least one photo diode, at least one Zennor diode, and a plurality of resistors connected in parallel to each other and the at least one photo diode and the at least one Zennor diode.

12. The method of claim 8, wherein the inverter is a DC-AC inverter.

13. The method of claim 8, wherein the AC power source is at least one of a grid or a photovoltaic.

14. The method of claim 8, wherein the first charge threshold is about 2.5 V/cell and the second charge threshold is about 3.1 V/cell.

* * * * *